US010518376B2

(12) United States Patent
Ulliman et al.

(10) Patent No.: US 10,518,376 B2
(45) Date of Patent: Dec. 31, 2019

(54) APPARATUS AND METHOD FOR SURFACE FINISHING A FLANGE SURFACE OF A FLANGE OF A PIPE

(71) Applicants: Matthew S. Ulliman, Dayton, OH (US); Jeff Martin, Troy, OH (US)

(72) Inventors: Matthew S. Ulliman, Dayton, OH (US); Jeff Martin, Troy, OH (US)

( * ) Notice: Subject to any disclaimer, the term of this patent is extended or adjusted under 35 U.S.C. 154(b) by 232 days.

(21) Appl. No.: 15/442,892

(22) Filed: Feb. 27, 2017

(65) Prior Publication Data
US 2018/0243878 A1    Aug. 30, 2018

(51) Int. Cl.
*B24B 9/00* (2006.01)
*B24B 23/08* (2006.01)
*B23B 5/16* (2006.01)

(52) U.S. Cl.
CPC ............... *B24B 9/007* (2013.01); *B23B 5/16* (2013.01); *B23B 5/161* (2013.01); *B24B 23/08* (2013.01)

(58) Field of Classification Search
CPC ......... B24B 5/363; B24B 9/007; B24B 23/08; B23B 5/16; B23B 5/161
USPC .................. 451/348, 424, 429, 439, 51, 344
See application file for complete search history.

(56) References Cited

U.S. PATENT DOCUMENTS

| | | | | |
|---|---|---|---|---|
| 1,994,152 A * | 3/1935 | Talboys | ................... | E01B 31/17 451/347 |
| 2,081,360 A * | 5/1937 | Mall | ..................... | B23D 45/006 451/429 |
| 2,575,212 A * | 11/1951 | Foster | ....................... | B24B 5/46 451/348 |
| 2,736,995 A * | 3/1956 | Richey | .................... | B24B 9/007 451/135 |
| 2,914,891 A * | 12/1959 | Nix | ........................ | B23D 21/08 266/56 |
| 3,458,958 A * | 8/1969 | Douglas | .................. | B24B 9/007 125/2 |
| 3,501,872 A * | 3/1970 | Mighton | ................. | B23B 5/168 266/56 |
| 3,942,248 A * | 3/1976 | Sherer | .................... | B23D 21/02 30/97 |
| 4,361,061 A * | 11/1982 | Pullen | .................... | B23B 3/265 409/179 |
| 4,483,106 A * | 11/1984 | Wachs | .................... | B24B 23/08 451/310 |
| 4,682,919 A * | 7/1987 | Mitchell | ................ | B23D 21/04 30/97 |
| 4,934,109 A * | 6/1990 | Allred | ..................... | B24B 9/007 451/439 |
| 5,062,189 A * | 11/1991 | Aebersold | .......... | B23K 11/3063 29/33 R |
| 5,377,238 A * | 12/1994 | Gebelin | ............... | B23Q 9/0078 29/402.06 |
| 7,152,325 B2 * | 12/2006 | Green | .................... | B23D 21/04 30/101 |

(Continued)

*Primary Examiner* — Eileen P Morgan
(74) *Attorney, Agent, or Firm* — Walters & Wasylyna LLC (57) ABSTRACT

An apparatus for surface finishing a flange surface of a flange of a pipe includes a frame assembly, a drive assembly coupled to the frame assembly, and a bracket assembly coupled to the frame assembly. The flange is clamped between the frame assembly and the drive assembly. The drive assembly circumferentially translates the apparatus around the pipe. A power tool is coupled to the bracket assembly to perform the surface finishing operation on the flange surface of the flange.

20 Claims, 8 Drawing Sheets

(56) References Cited

U.S. PATENT DOCUMENTS

| | | | | |
|---|---|---|---|---|
| 7,200,889 B2* | 4/2007 | Vohra | ............... | B08B 1/008 |
| | | | | 134/198 |
| 9,278,417 B2* | 3/2016 | Pierce | ............... | B23D 21/04 |
| 9,610,636 B2* | 4/2017 | Pierce | ............... | B23D 21/04 |
| 9,630,252 B2* | 4/2017 | Lee, II | ............... | B23B 5/161 |
| 9,802,285 B2* | 10/2017 | Rieth | ............... | B23Q 9/02 |
| 10,099,292 B2* | 10/2018 | Coakley | ............... | B23B 5/163 |
| 10,207,340 B2* | 2/2019 | Merle | ............... | B29C 37/04 |
| 10,220,456 B2* | 3/2019 | Pierce | ............... | B23C 3/122 |
| 2005/0076508 A1* | 4/2005 | Green | ............... | B23D 21/04 |
| | | | | 30/101 |
| 2005/0268940 A1* | 12/2005 | Vohra | ............... | B08B 1/008 |
| | | | | 134/6 |
| 2010/0029184 A1* | 2/2010 | Place | ............... | B24B 5/363 |
| | | | | 451/303 |
| 2015/0290757 A1* | 10/2015 | Rieth | ............... | B23Q 9/02 |
| | | | | 409/179 |
| 2015/0306682 A1* | 10/2015 | Merle | ............... | B23C 3/02 |
| | | | | 82/113 |
| 2018/0243832 A1* | 8/2018 | Bruinsma | ............... | B24B 23/028 |

* cited by examiner

APPARATUS AND METHOD FOR SURFACE FINISHING A FLANGE SURFACE OF A FLANGE OF A PIPE

FIELD

The present disclosure is generally related to surface finishing tools and, more particularly, to apparatuses and methods for automatic surface finishing of a surface of a flange of a pipe.

BACKGROUND

A pipe flange is a disc, collar or ring attached to a pipe for the purpose of providing increased support or implementing the attachment of another item, such as an additional section of pipe. During installation of two abutting sections of pipe, a surface of the flange of one pipe mates with a surface of the flange of an adjacent pipe and then the flanges are connected together, for example, by welding or with bolts. However, the mating contact surface of the flange may require one or more surface finishing operations prior to connection of the flanges. These surface finishing operations are time consuming and very labor intensive.

Accordingly, those skilled in the art continue with research and development efforts in the field of surface finishing flange surfaces of pipes.

SUMMARY

In one embodiment, the disclosed apparatus for surface finishing a flange surface of a flange of a pipe includes a frame assembly, a drive assembly coupled to the frame assembly, and a bracket assembly coupled to the frame assembly. The flange is clamped between the frame assembly and the drive assembly. The drive assembly circumferentially translates the apparatus around the pipe. A power tool is coupled to the bracket assembly to perform the surface finishing operation on the flange surface of the flange.

In another embodiment, the disclosed apparatus for surface finishing a flange surface of a flange of a pipe includes a drive rail, a clamp connected to the drive rail, a bracket rail connected to the clamp, a drive motor coupled to the drive rail, a drive roller operatively connected to the drive motor, wherein the drive roller is positioned to engage an inner pipe surface of the pipe, a pair of circumferential flange surface rollers freely rotatably connected to the clamp, wherein the pair of circumferential flange surface rollers are positioned to engage a circumferential flange surface of the flange, a pair of circumferential flange surface rollers freely rotatably connected to the clamp, wherein the pair of circumferential flange surface rollers are positioned to engage a circumferential flange surface of the flange, a pair of flange surface rollers freely rotatably connected to the clamp, wherein the pair of flange surface rollers are positioned to engage a flange surface of the flange, an opposed flange surface roller freely rotatably connected to the clamp, wherein the opposed flange surface roller is positioned to engage an opposed flange surface of the flange, and a bracket assembly coupled to the bracket rail. The flange is clamped between the drive roller and the pair of circumferential flange surface rollers. The flange is further clamped between the pair of flange rollers and the opposed flange roller. A power tool is coupled to the bracket assembly to perform the surface finishing operation on the flange surface of the flange. Rotation of the drive roller, in contact with the inner pipe surface of the pipe, circumferentially translates the apparatus around the pipe during the surface finishing operation.

In yet another embodiment, the disclosed method for surface finishing a flange surface of a flange of a pipe includes the steps of: (1) providing an apparatus that includes a frame assembly, a drive assembly coupled to the frame assembly, and a bracket assembly coupled to the frame assembly; (2) clamping the flange between the frame assembly and the drive assembly; (3) circumferentially translating the apparatus around the pipe; and (4) surface finishing the flange surface of the flange with a power tool coupled to the bracket assembly.

Other embodiments of the disclosed systems and methods will become apparent from the following detailed description, the accompanying drawings and the appended claims.

DETAILED DESCRIPTION

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIGS. 1-7, disclosed is one embodiment of an apparatus 100 adapted for an automated surface finishing operation, for example, of a flange surface 304 of a flange 302 of a pipe 300. The apparatus 100 includes a frame assembly 102, a drive assembly 104 and a bracket assembly 106. A power tool 200 is coupled to the apparatus 100 and is used to surface finish the flange surface 304 of the flange 302.

In FIGS. 1-7, the pipe 300 and the flange 302 of the pipe 300 are shown as transparent to more clearly illustrate the disclosed apparatus 100 without being obstructed by the pipe 300 or the flange 302.

The flange surface 304 of the flange 302 of the pipe 300, which may also be referred to as a mounting flange surface or top flange surface, includes (or defines) a contact surface, or portion of the surface, of the flange 302 that will be placed into abutting contact with another flange contact surface when two sections of pipe are connected together. The flange surface 304 includes the surface, or portion of the surface, that is to be subjected to the surface finishing operation. In an example construction of the flange 302 of the pipe 300, the flange surface 304 is planar.

An opposed flange surface 312 (FIGS. 2,3,5 and 7) of the flange 302 of the pipe 300, which may also be referred to a bottom flange surface, includes a surface, or portion of the surface, that is opposite to the flange surface 304. In an example construction of the flange 302 of the pipe 300, the opposed flange surface 312 is planar.

A circumferential flange surface 314 of the flange 302 of the pipe 300 includes a surface, or portion of the surface, extending between the flange surface 304 and the opposed flange surface 312. The circumferential flange surface 314 is approximately parallel to an inner pipe surface 306 of the pipe 300 and defines an outer diameter of the flange 302 of the pipe 300.

A width 316 (FIGS. 1-4 and 6) of the flange 302 of the pipe 300, and, for example, the flange surface 304 of the flange 302, is defined as the linear distance, in plan view, between a point on the inner pipe surface 306 and an opposing point on the circumferential flange surface 314. A thickness 318 (FIGS. 2, 3, 5 and 7) of the flange 302 is defined as the linear distance, in side elevation view, between a point on the flange surface 304 and an opposing point on the opposed flange surface 312.

In an example implementation of use, the apparatus 100 is coupled to the pipe 300 and the power tool 200 is coupled to the apparatus 100. The power tool 200 is positioned in contact with the flange surface 304 to perform the surface finishing operation on the flange surface 304. Examples of surface finishing operations performed by the power tool 200 may include stripping, cleaning, deburring, sanding, grinding, cutting, polishing and the like. The apparatus 100 automatically moves the power tool 200 along the flange surface 304.

The frame assembly 102 is configured to engage the flange 302 of the pipe 300. As an example, upon attachment of the apparatus 100 to the pipe 300, the frame assembly 102 may engage the flange surface 304, the opposed flange surface 312 (FIGS. 2, 3, 5 and 7), and the circumferential flange surface 314, as best illustrated in FIGS. 3, 5 and 7. Upon attachment of the apparatus 100 to the pipe 300, the frame assembly 102 extends across the flange surface 304 of the flange 302 and the flange 302 is clamped between the frame assembly 102 and the drive assembly 104, as best illustrated in FIGS. 1 and 3-7.

Figure 1:
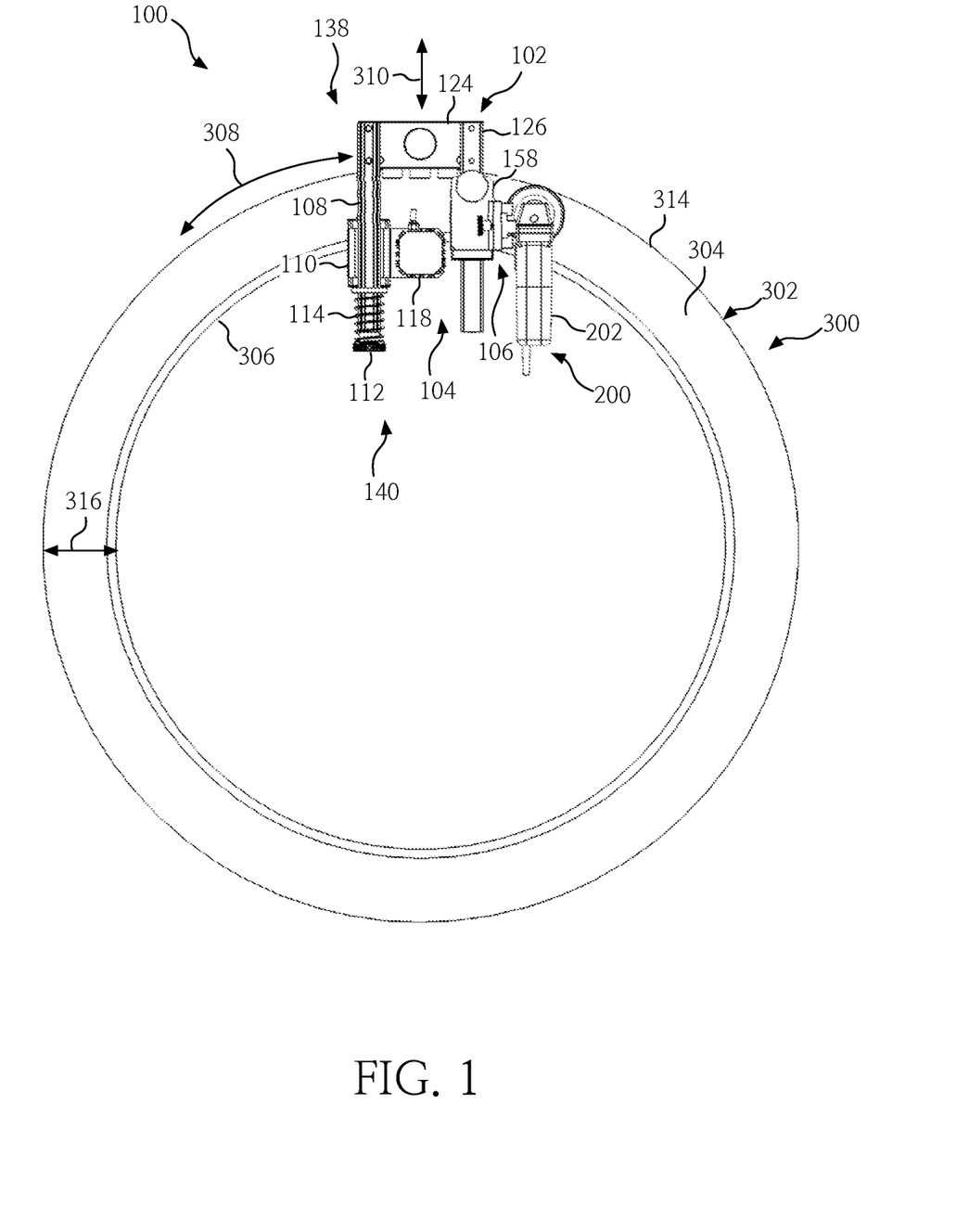
FIG. 1 is a schematic environmental top plan view of one embodiment of the disclosed apparatus for surface finishing a flange surface of a flange of a pipe.

The drive assembly 104 is coupled to the frame assembly 102. The drive assembly 104 is configured to engage the pipe 300. As an example, upon attachment of the apparatus 100 to the pipe 300, the drive assembly 104 may engage the inner pipe surface 306 of the pipe 300, as best illustrated in FIGS. 3, 5 and 7. The drive assembly 104 is also configured to circumferentially translate the apparatus 100 (the frame assembly 102 and, thus, the power tool 200) around the pipe 300. For example, drive assembly 104 may circumferentially translate the apparatus 100 in the directions of directional arrow 308 (FIGS. 1, 4 and 6).

The bracket assembly 106 is coupled to the frame assembly 102. The bracket assembly 106 is configured to support and position the power tool 200 relative to the flange surface 304 of the flange 302. Upon attachment of the apparatus 100 to the pipe 300 and during the surface finishing operation, the power tool 200 is positioned such that a surface finishing attachment 204 (FIGS. 2 and 3) of the power tool 200 is in contact with the flange surface 304.

The power tool 200 may be any tool used for cutting, grinding and/or polishing. As a non-limiting example, the power tool 200 may be an angle grinder 202, also known as a side grinder or disc grinder, such as an angle grinder commercially available from the DeWalt, Ryobi, Milwaukee, Makita and others.

The surface finishing attachment 204 may be any attachment used for stripping, cleaning, deburring, sanding, grinding, cutting and/or polishing of a surface. As non-limiting examples, the surface finishing attachments 204 may be an abrasive disc, a brush (e.g., a wire brush) and the like. The surface finishing attachment 204 is mounted to the power tool 200 at a right angle.

The power tool 200 (e.g., the angle grinder 202) includes a drive mechanism 206. The drive mechanism 206 is operatively coupled to the surface finishing attachment 204 to rotate the surface finishing attachment 204. The drive mechanism 206 may be configured to rotate the surface finishing attachment 204 at various speeds. The drive mechanism 206 may include various components common in the art, such as a motor, a geared head and the like, housed within an exterior housing. The power tool 200 (e.g., the drive mechanism 206) may be powered by an electric motor, compressed air and the like.

The power tool 200 (e.g., the angle grinder 202) may also include a guard 208 (e.g., an adjustable guard) mounted to the housing and positioned around the surface finishing attachment 204. In FIGS. 2, 3 and 7-9, the guard 208 is shown as transparent to more clearly illustrate the disclosed apparatus 100 without being obstructed by the guard 208.

The apparatus 100 may be configured to be adjustably mounted to and used for a surface finishing operation on pipes 300 and/or flanges 302 having different dimensions, for example, of various flange widths 316 (FIGS. 1-4 and 6) and/or various flange thicknesses 318 (FIGS. 2, 3, 5 and 7).

Figure 2:
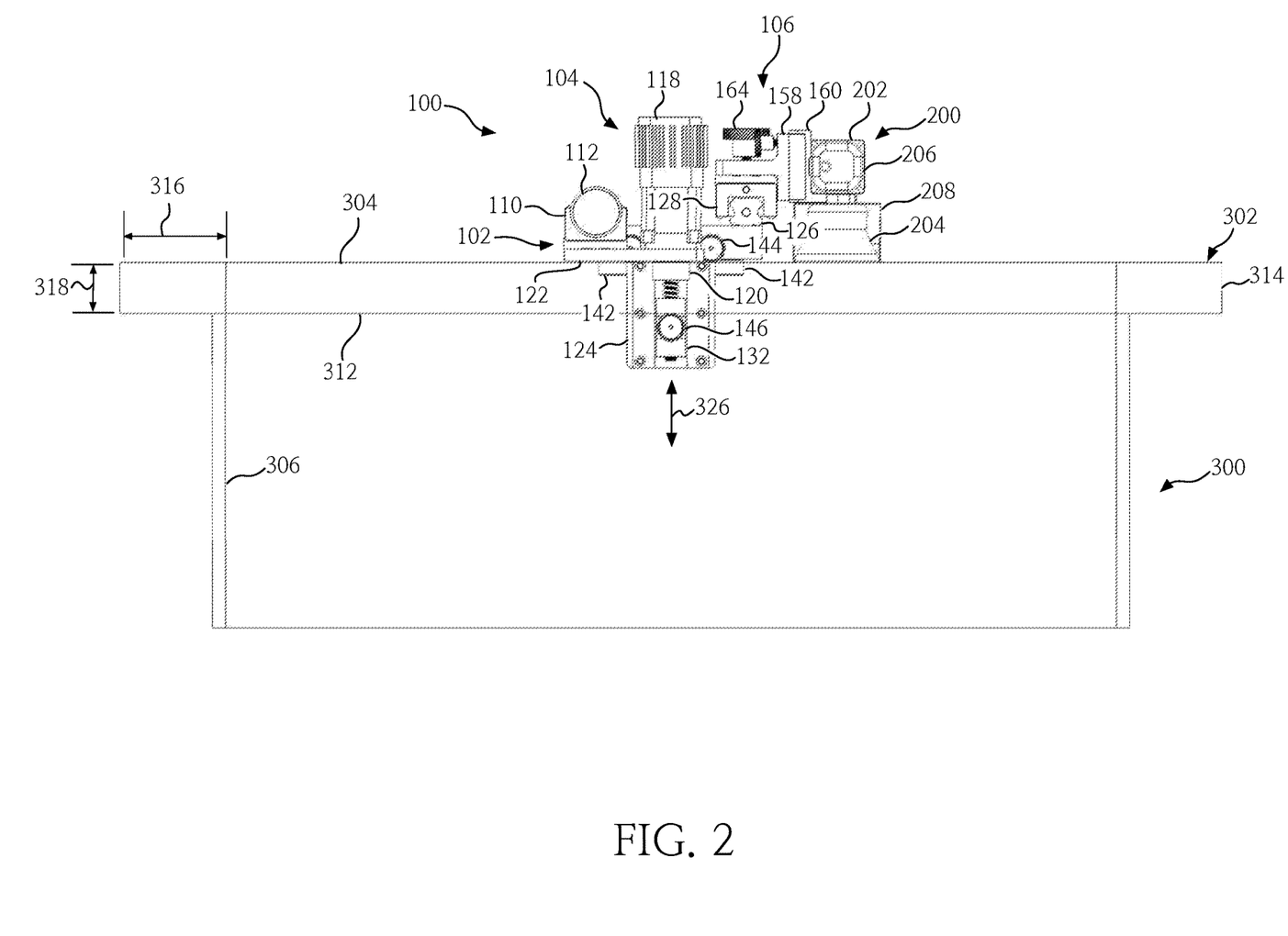
FIG. 2 is a schematic environmental front elevation view of the apparatus of FIG. 1.
Figure 3:
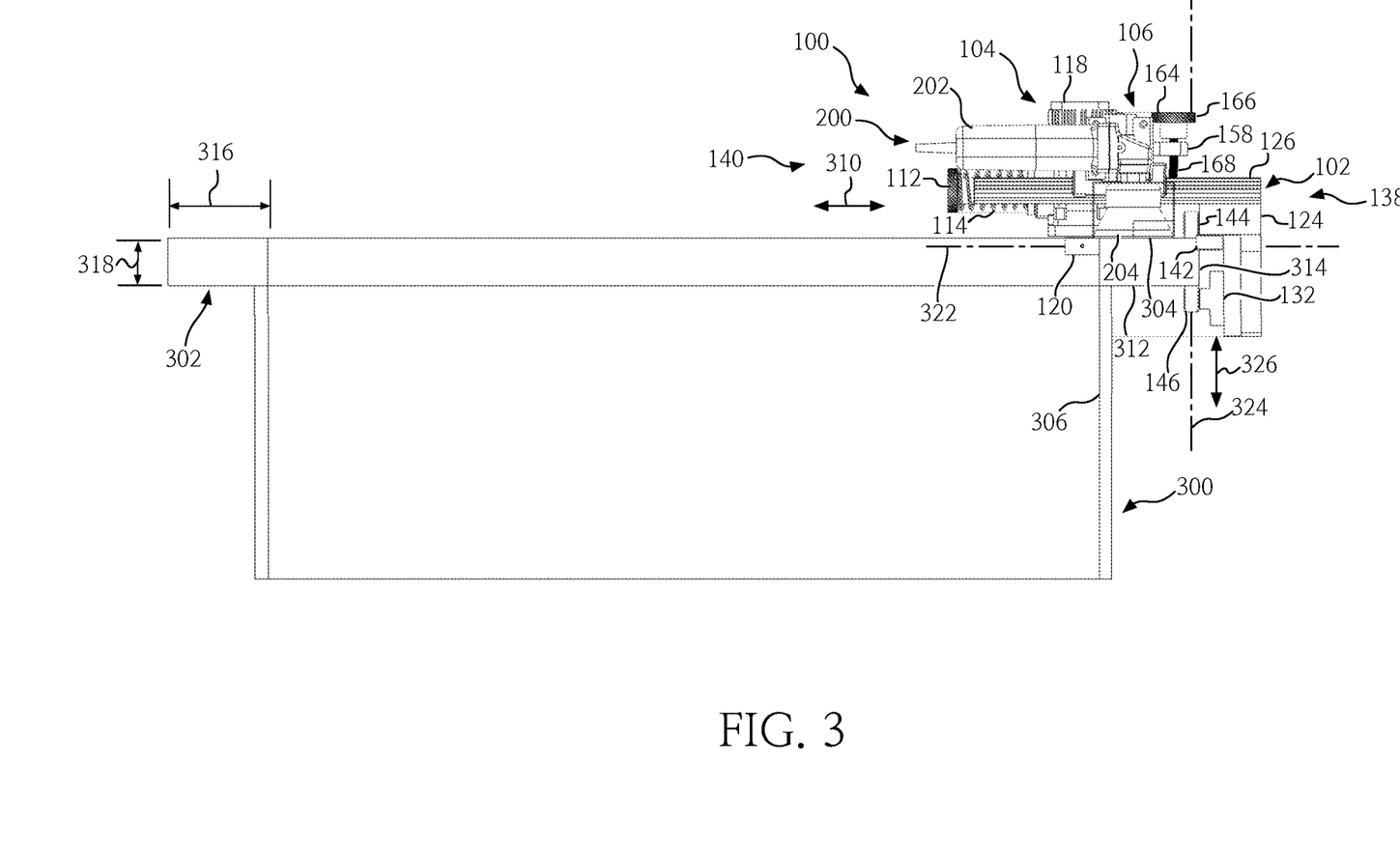
FIG. 3 is a schematic environmental right side elevation view of the apparatus of FIG. 1.
Figure 4:
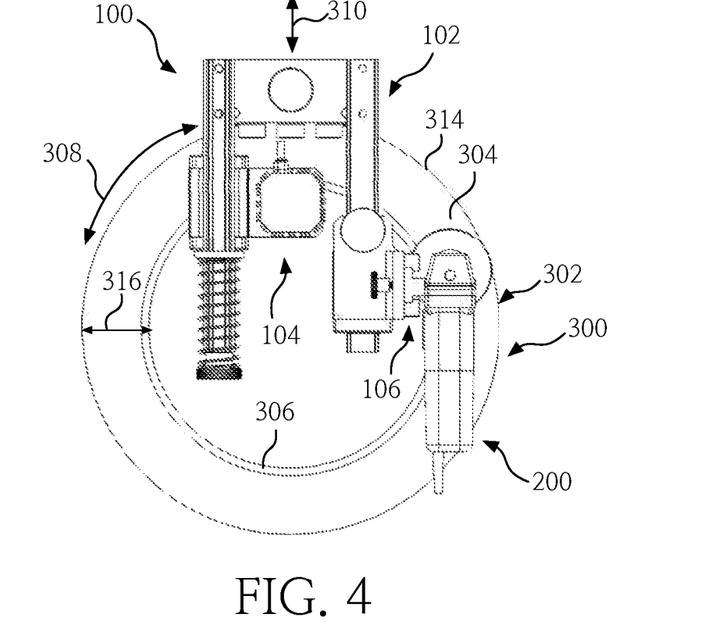
FIG. 4 is a schematic environmental top plan view of the disclosed apparatus.
Figure 5:
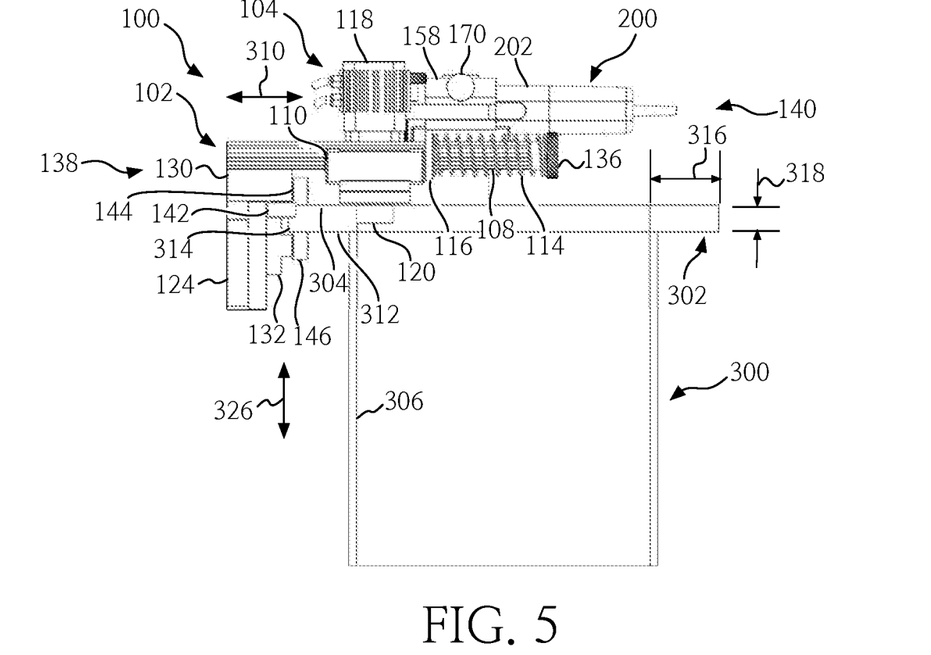
FIG. 5 is a schematic environmental left side elevation view of the apparatus of FIG. 4.
Figure 6:
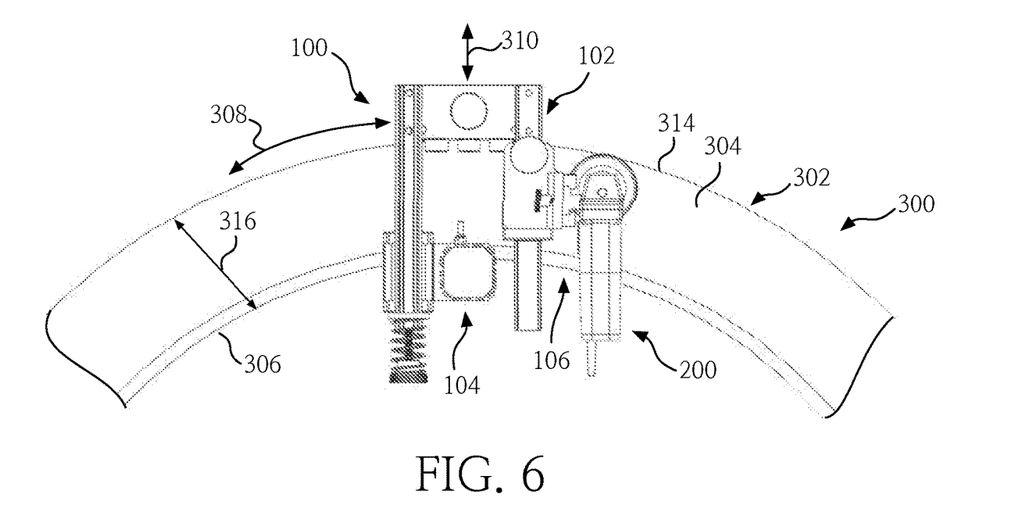
FIG. 6 is a schematic partial environmental top plan view of the disclosed apparatus.
Figure 7:
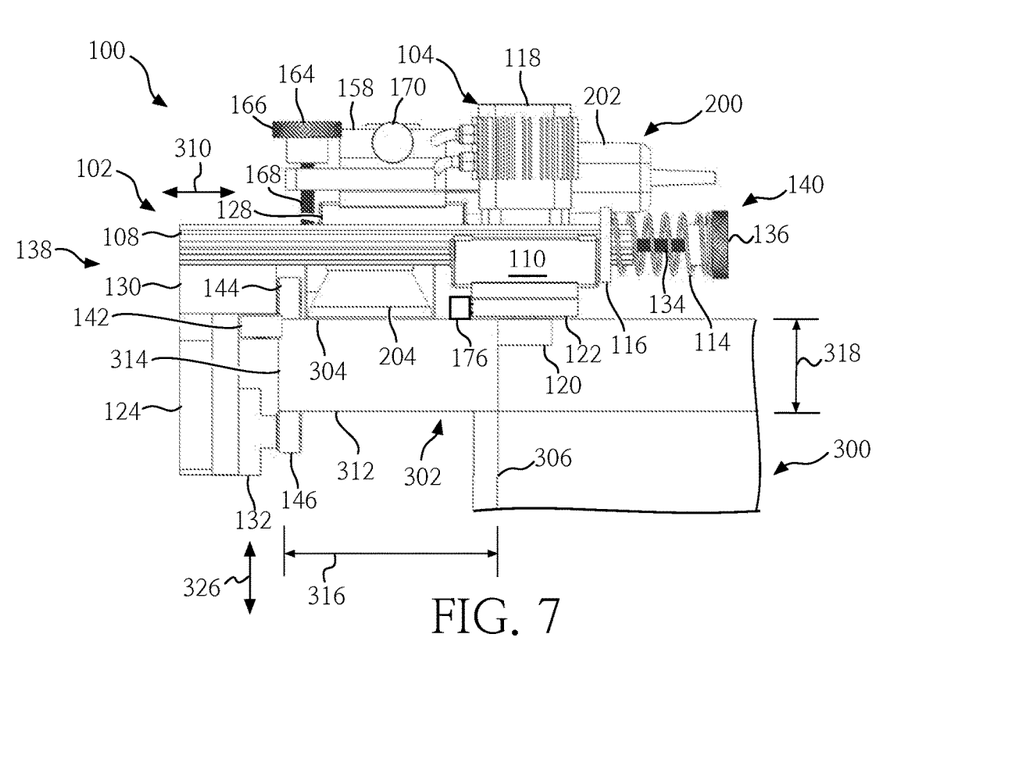
FIG. 7 is a schematic partial environmental left side elevation view of the apparatus of FIG. 6.

As examples, and as illustrated in FIGS. 1-7, the apparatus 100 may be adjustably mounted to a pipe 300 with a flange 302 having a width 316 ranging from approximately 3.75 inches to approximately 8 inches and/or a thickness 318 ranging from approximately 1.42 inches to approximately 3.38 inches, such as those commonly associated with a pipe 300 having an inner diameter ranging from approximately 16 inches (e.g., FIGS. 4 and 5) to approximately 60 inches (e.g., FIGS. 6 and 7), such as approximately 48 inches (e.g., FIGS. 1-3).

The drive assembly 104 may be movable relative to the frame assembly 102. As an example, the drive assembly 104 may move linearly relative to the frame assembly 102, for example, in the directions of directional arrow 310 (e.g., radially inward and/or radially outward relative to a center of the pipe 300) (FIGS. 1 and 3-7).

Linear movement of the drive assembly 104 relative to the frame assembly 102 may accommodate or account for the width 316 of the flange 302. For example, linear adjustment of the position of the drive assembly 104 relative to the frame assembly 102 may clamp the pipe 300 between the frame assembly 102, which engages the circumferential flange surface 314 of the flange 302, and the drive assembly 104, which engages the inner pipe surface 306 of the pipe 300.

The drive assembly 104 may be biased into engagement with the pipe 300. For example, linearly biasing the drive assembly 104 radially outward relative to the center of the pipe 300 may maintain engagement between the drive assembly 104 and the inner pipe surface 306 of the pipe 300, as the apparatus 100 moves circumferentially along the flange 302 of the pipe 300.

The bracket assembly 106 may be movable relative to the frame assembly 102. As an example, the bracket assembly 106 may move linearly relative to the frame assembly 102, for example, in the directions of directional arrow 310 (e.g., radially inward relative to the pipe 300 and/or radially outward relative to the pipe 300) (FIGS. 1 and 3-7). As another example, the bracket assembly 106 may move angularly (e.g., rotate) relative to the frame assembly 102.

Linear movement of the bracket assembly 106 relative to the frame assembly 102 may account for the width 316 of the flange 302. For example, linear adjustment of the position of the bracket assembly 106 relative to the frame assembly 102 may position the surface finishing attachment 204 of the power tool 200 at different radial locations on the flange surface 304. As an example, and as illustrated in FIG. 4, when the width 316 of the flange 302 is equal to or smaller than a diameter of the surface finishing attachment 204, linear adjustment of the position of the bracket assembly 106 relative to the frame assembly 102 appropriately positions the surface finishing attachment 204 on the flange surface 304 such that the entire flange surface 304 is worked upon as the apparatus 100 moves circumferentially along the flange 302 of the pipe 300. As another example, and as illustrated in FIGS. 1 and 6, when the width 316 of the flange 302 is larger than the diameter of the surface finishing attachment 204, linear adjustment of the position of the bracket assembly 106 relative to the frame assembly 102 appropriately positions the surface finishing attachment 204 on the flange surface 304 such that a portion of the flange surface 304 is worked upon, as the apparatus 100 moves circumferentially along the flange 302 of the pipe 300. A subsequent linear adjustment of the position of the bracket assembly 106 relative to the frame assembly 102 (e.g., radially inward) appropriately positions the surface finishing attachment 204 on the flange surface 304 such that another portion of the flange surface 304 is worked upon, as the apparatus 100 moves circumferentially along the flange 302 of the pipe 300.

Rotation of the bracket assembly 106 relative to the frame assembly 102 may angularly orient the surface finishing attachment 204 of the power tool 200 relative to the flange surface 304.

Figure 8:
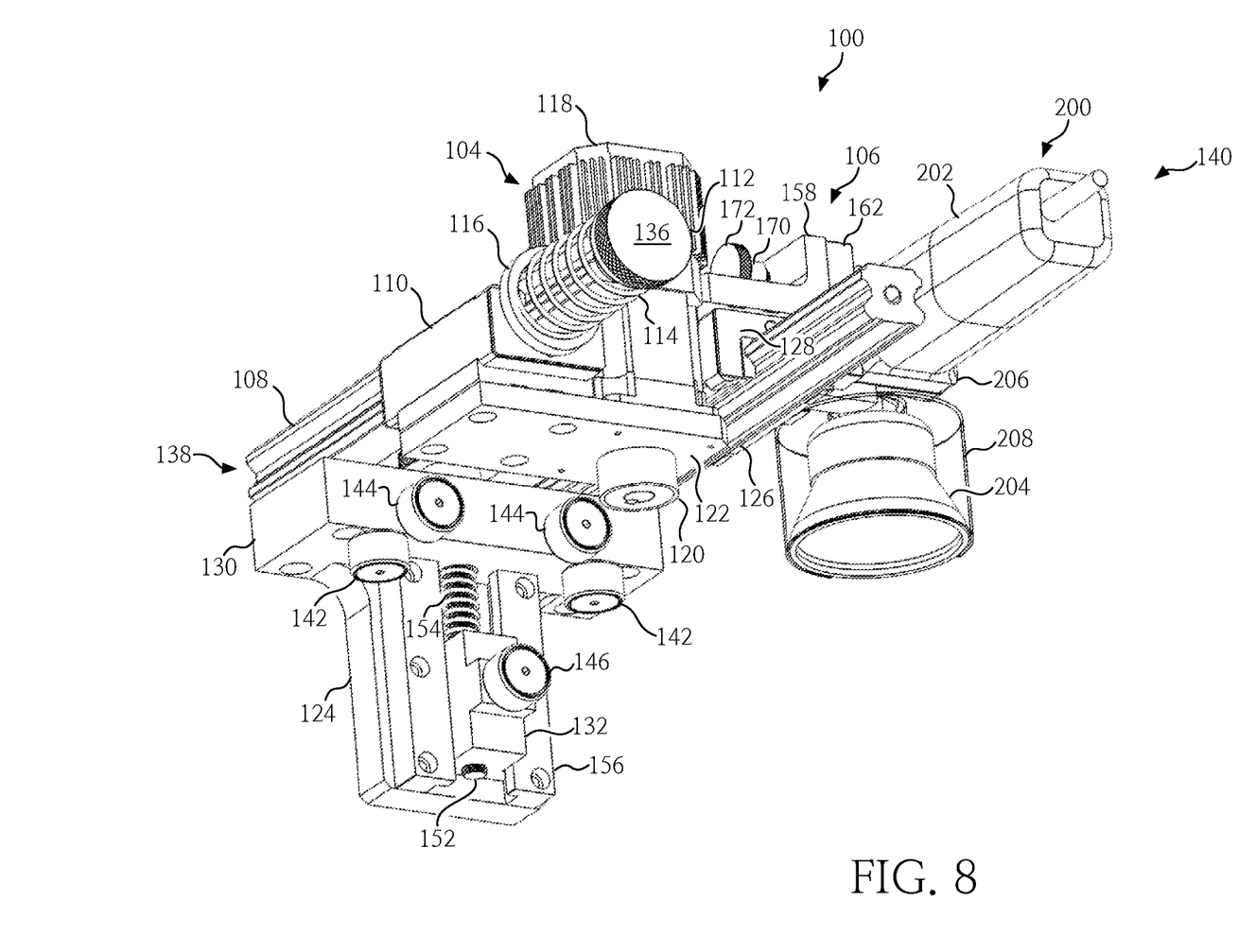
FIG. 8 is a schematic front and bottom perspective view of the disclosed apparatus.
Figure 9:
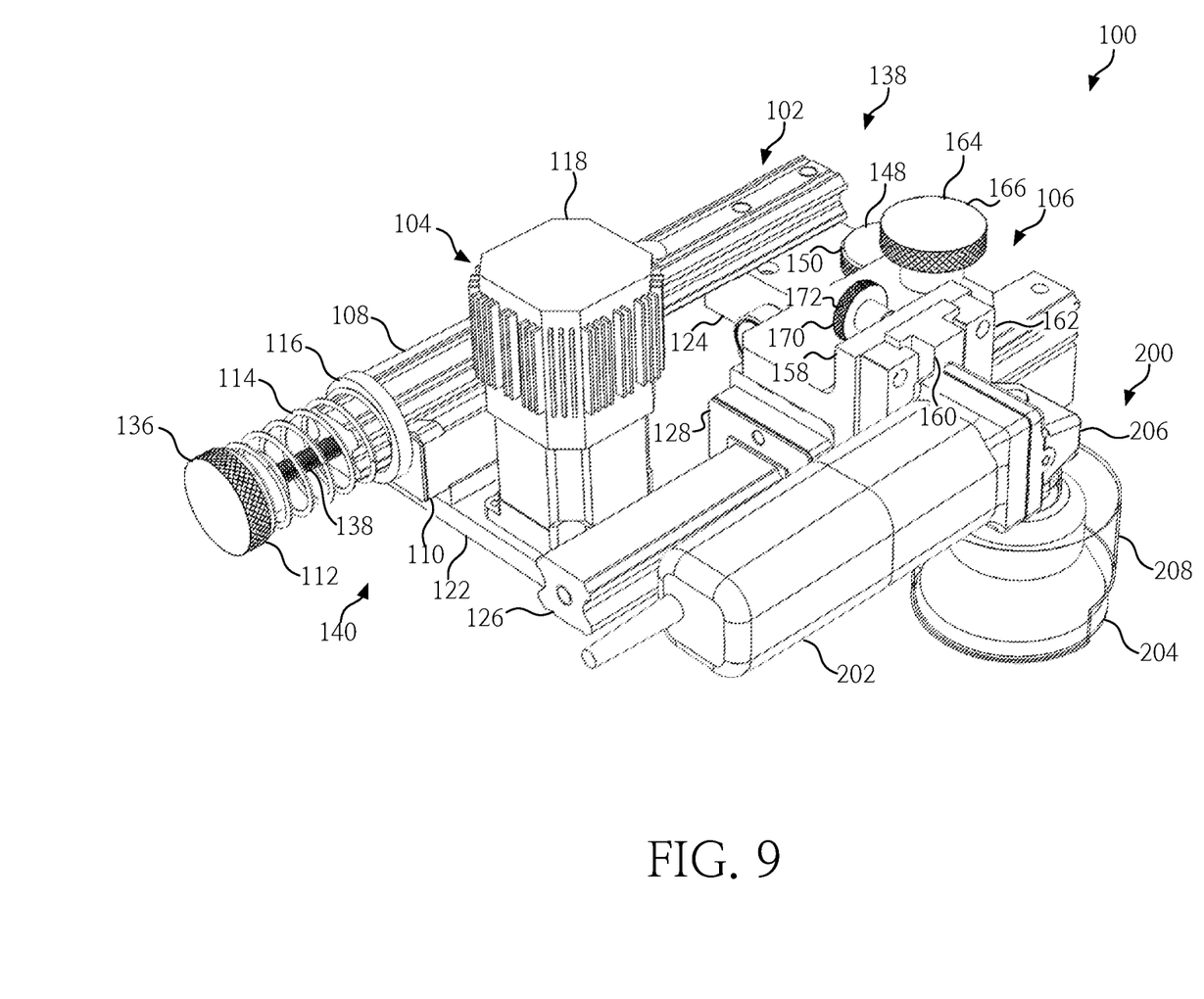
FIG. 9 is a schematic top and right side perspective view of the disclosed apparatus.

Referring to FIGS. 8 and 9, the frame assembly 102 includes a drive rail 108 and a drive carriage 110. The drive carriage 110 is connected to and freely movable along the drive rail 108. The drive rail 108 guides the drive carriage 110 along a linear path, for example, in the directions of directional arrow 310 (FIGS. 1 and 3-7). The drive assembly 104 is connected to the drive carriage 110, such that linear movement of the drive carriage 110 along the drive rail 108 adjusts the position of the drive assembly 104 relative to the frame assembly 102.

The drive assembly 104 includes a drive motor 118 and a drive roller 120. The drive roller 120 is operatively coupled to the drive motor 118. The drive motor 118 may be an electric motor, a hydraulic motor or a pneumatic motor. The drive motor 118 is operatively coupled to a power supply (not shown) via a power supply line illustrated by a fragmented line (e.g., electrical cable, hydraulic tube or pneumatic tube) connected to the drive motor 118 in FIGS. 1 and 4-7.

The drive motor 118 may be operatively coupled to and controlled by a controller (not shown). Optionally, the controller may be remotely located away from the apparatus 100 in order to allow an operator to remain at a safe distance from the apparatus 100 during the surface finishing operation. As an example, the drive motor 118 may be wired to the controller via a control line illustrated by another fragmented line (e.g., cable) connected to the drive motor 118 in FIGS. 5 and 7. As another example, the drive motor 118 may be wirelessly connected to the controller.

The drive motor 118 is connected to the drive carriage 110. The drive roller 120 is positioned to engage the pipe 300. As an example, the frame assembly 102 also includes a drive mount 122. The drive mount 122 is connected to the drive carriage 110. The drive motor 118 is connected to the drive mount 122 such that a drive shaft (not visible) of the drive motor 118 extends through the drive mount 122. The drive roller 120 is connected to the drive shaft of the drive motor 118 on an opposing side of the drive mount 122.

Upon attachment of the apparatus 100 to the pipe 300, a contact surface of the drive roller 120 is positioned to make engaging contact with the inner pipe surface 306, as best illustrated in FIGS. 3, 5 and 7. As an example, the drive roller 120 is a flat roller having a straight contact surface. As another example, the drive roller 120 is a crown roller having a contoured contact surface (e.g., convex, a concave, a straight taper, a straight taper with center flat, etc.).

The frame assembly 102 includes a bracket rail 126 and a bracket carriage 128. In an example embodiment, the bracket rail 126 is spaced apart from and oriented parallel to the drive rail 108. The bracket carriage 128 is connected to and freely movable along the bracket rail 126. The bracket rail 126 guides the bracket carriage 128 along a linear path, for example, in the directions of directional arrow 310 (FIGS. 1 and 3-7). The bracket assembly 106 is connected to the bracket carriage 128, such that linear movement of the bracket carriage 128 along the bracket rail 126 adjusts the position of the bracket assembly 106 relative to the frame assembly.

The frame assembly 102 includes a clamp 124. The clamp 124 is connected to (e.g., interconnects) the drive rail 108 and the bracket rail 126. In an example embodiment, the clamp 124 is connected proximate to (e.g., at or near) a first end 138 of the frame assembly 102 (e.g., first ends of the drive rail 108 and the bracket rail 126).

The clamp 124 is configured to engage the flange 302 in two perpendicular virtual planes (e.g., a first virtual plane 322 parallel to the flange surface 304 and a second virtual plane 324 perpendicular to the first virtual plane 322), as illustrated in FIG. 3. The clamp 124 includes a stationary jaw 130 and a movable jaw 132. The movable jaw 132 is linearly moveable relative to the stationary jaw 130, for example, in the directions of directional arrow 326 (FIGS. 2, 3, 5 and 7). Upon attachment of the apparatus 100 to the pipe 300, the flange 302 is positioned and clamped between the stationary jaw 130 and the drive assembly 104 (e.g., in the first virtual plane 322) and between the stationary jaw 130 and the movable jaw 132 (e.g., in the second virtual plane 324).

In an embodiment, the stationary jaw 130 of the clamp 124 includes at least one circumferential flange surface roller 142. The circumferential flange surface roller 142 is freely rotatably coupled to the stationary jaw 130. Upon attachment of the apparatus 100 to the pipe 300, a contact surface of the circumferential flange surface roller 142 is positioned to make engaging contact with the circumferential flange surface 314 of the flange 302, as best illustrated in FIGS. 3, 5 and 7.

Thus, upon attachment of the apparatus 100 to the pipe 300, the flange 302 is clamped between the drive roller 120, which is in contact with the inner pipe surface 306, and the circumferential flange surface roller 142, which is in contact with the circumferential flange surface 314, as best illustrated in FIGS. 3, 5 and 7. As an example, the circumferential flange surface roller 142 is a flat roller having a straight contact surface. As another example, the circumferential flange surface roller 142 is a crown roller having a contoured contact surface.

In the illustrative embodiment, the drive assembly 104 includes one drive motor 118 and one drive roller 120 and the frame assembly 102 includes a pair of circumferential flange surface rollers 142 coupled to the stationary jaw 130. However, in other embodiments, the drive assembly 104 may include more than one drive motor 118 and/or more than one drive roller 120 and/or the frame assembly 102 may include one circumferential flange surface roller 142 or more than two circumferential flange surface rollers 142. In an embodiment having one drive roller 120 and one circumferential flange surface roller 142, the drive roller 120 is aligned with the circumferential flange surface roller 142 such that the point of contact with the inner pipe surface 306 is aligned with the point of contact with the circumferential flange surface 314. In an embodiment having one drive roller 120 and two circumferential flange surface roller 142, the drive roller 120 is positioned between the circumferential flange surface rollers 142 such that the point of contact with the inner pipe surface 306 is centered between the points of contact with the circumferential flange surface 314.

The frame assembly 102 also includes a drive adjuster 112 connected to a second end of the drive rail 108 opposite the clamp 124 (e.g., at a second end 140 of the frame assembly 102). As an example, the drive adjuster 112 includes a threaded shaft 134 and a head 136. The shaft 134 (FIGS. 6, 7 and 9) of the drive adjuster 112 is threadably coupled to a threaded hole formed in the end of the drive rail 108.

In an embodiment, a drive positioner 114 is positioned between and engages the drive adjuster 112 and the drive carriage 110. As an example, the drive positioner 114 is a compression coil, or helical, spring coaxially positioned around the first end of the drive rail 108. A first end of the drive positioner 114 engages the head 136 of the drive adjuster 112 and an opposed second end of the drive positioner 114 engages the drive carriage 110. The drive positioner 114 may also include a retaining ring 116 disposed at its second end to contact the drive carriage 110.

The drive adjuster 112 and the drive positioner 114 set the position of the drive carriage 110 and, thus, the drive assembly 104 relative to the clamp 124 and clamp the flange 302 between the drive roller 120 and the circumferential flange surface roller 142. Adjustment (e.g., rotation) of the drive adjuster 112 adjusts the linear position of the drive carriage 110 and, thus, the drive assembly 104 relative to the clamp 124 to accommodate or account for different widths 316 (FIGS. 1-7) of the flange 302. As an example, rotation (e.g., tightening) of the drive adjuster 112 moves the head 136 of the drive adjuster 112 toward the second end of the drive rail 108, which moves the drive positioner 114 toward the clamp 124, which in turn moves the drive carriage 110 and the drive assembly 104 toward the clamp 124 (e.g., radially outward relative to the pipe 300). As another example, counter-rotation (e.g., loosening) of the drive adjuster 112 moves the head 136 of the drive adjuster 112 away the second end of the drive rail 108, which allows the drive positioner 114 to move away from the clamp 124, which in turn allows the drive carriage 110 and the drive assembly 104 to move away from the clamp 124 (e.g., radially inward relative to the pipe 300).

Once the flange 302 is clamped between the drive roller 120 and the circumferential flange surface roller 142, the drive positioner 114 exerts a compression force upon the drive carriage 110 to maintain the drive roller 120 in contact with the inner pipe surface 306 and the circumferential flange surface roller 142 in contact with the circumferential flange surface 314 of the flange 302 as the drive assembly 104 circumferentially translates the apparatus 100 around the pipe 300 during the surface finishing operation.

In an embodiment, the drive positioner 114 (e.g., the coil spring) biases the drive roller 120 into contact with the inner pipe surface 306 as the drive assembly 104 circumferentially translates the apparatus 100 around the pipe 300 during the surface finishing operation. The drive positioner 114 may also allow for some linear movement of the drive carriage 110 and the drive assembly 104 when the drive roller 120 encounters an obstacle (e.g., a non-smooth portion of the inner pipe surface 306) or when the circumferential flange surface roller 142 encounters an obstacle (e.g., a non-smooth portion of the circumferential flange surface 314). The magnitude of the biasing compression force and the amount of available linear movement may depend upon the adjusted position of the drive adjuster 112.

In an embodiment, the drive assembly 104 also includes a balance roller 176 (FIG. 7). The balance roller 176 is freely rotatably connected to the drive mount 122. Upon attachment of the apparatus 100 to the pipe 300, a contact surface of the balance roller 176 is positioned to make engaging contact with the flange surface 304. The balance roller 176 counters a torque exerted on the frame assembly 102 due to the weight of the drive assembly 104.

In an embodiment, the stationary jaw 130 of the clamp 124 includes at least one flange surface roller 144. The flange surface roller 144 is freely rotatably coupled to the stationary jaw 130. Upon attachment of the apparatus 100 to the pipe 300, a contact surface of the flange surface roller 144 is positioned to make engaging contact with the flange surface 304 of the flange 302, as best illustrated in FIGS. 3, 5 and 7. The movable jaw 132 includes at least one opposed flange surface roller 146. The opposed flange surface roller 146 is freely rotatably coupled to the movable jaw 132. Upon attachment of the apparatus 100 to the pipe 300, a contact surface of the opposed flange surface roller 146 is positioned to make engaging contact with the opposed flange surface 312 of the flange 302, as best illustrated in FIGS. 3, 5 and 7.

Thus, upon attachment of the apparatus 100 to the pipe 300, the flange 302 is also clamped between the flange surface roller 144, which is in contact with the flange surface 304, and the opposed flange surface roller 146, which is in contact with the opposed flange surface 312, as best illustrated in FIGS. 3, 5 and 7. As an example, the flange surface roller 144 and/or the opposed flange surface roller 146 are flat rollers having a straight contact surface. As another example, the flange surface roller 144 and/or the opposed flange surface roller 146 are crown rollers having a contoured contact surface.

In the illustrative embodiment, the frame assembly 102 includes a pair of flange surface rollers 144 and one opposed flange surface roller 146. However, in other embodiments, the frame assembly 102 may include one flange surface roller 144 or more than two flange surface rollers 144 and/or more than one opposed flange surface roller 146. In an embodiment having one flange surface roller 144 and one opposed flange surface roller 146, the opposed flange surface roller 146 is aligned with the flange surface roller 144 such that the point of contact with the opposed flange surface 312 is aligned with the point of contact with the flange surface 304. In an embodiment having one opposed flange surface roller 146 and two flange surface roller 144, the opposed flange surface roller 146 is positioned between the flange surface rollers 144 such that the point of contact with the opposed flange surface 312 is centered between the points of contact with the flange surface 304.

The clamp 124 includes a clamp adjuster 148 (FIG. 9) connected to stationary jaw 130 and the movable jaw 132. As an example, the clamp adjuster 148 includes a threaded shaft 152 and a head 150 (FIG. 9). The shaft 152 of the clamp adjuster 148 extends through a smooth bore hole formed in through the stationary jaw 130 and is threadably coupled to a threaded hole formed through the movable jaw 132.

The clamp adjuster 148 sets the position of the movable jaw 132 relative to the stationary jaw 130 and, thus, the position of the opposed flange surface roller 146 relative to the flange surface roller 144 and clamps the flange 302 between the flange surface roller 144 and the opposed flange surface roller 146. Adjustment (e.g., rotation) of the clamp adjuster 148 adjusts the linear position of the movable jaw 132 relative to the stationary jaw 130 and, thus, the position of the opposed flange surface roller 146 relative to the flange surface roller 144 to accommodate or account for different thicknesses 318 (FIGS. 2, 3, 5 and 7) of the flange 302. As an example, rotation (e.g., tightening) of the clamp adjuster 148 moves the movable jaw 132 toward the stationary jaw 130 and, thus, the opposed flange surface roller 146 toward the flange surface roller 144 (e.g., inwardly). As an example, counter-rotation (e.g., loosening) of the clamp adjuster 148 moves the movable jaw 132 away from the stationary jaw 130 and, thus, the opposed flange surface roller 146 away from the flange surface roller 144 (e.g., outwardly).

The clamp 124 may also include a spring 154 (FIG. 8). As an example, the spring 154 is a compression coil, or helical, spring positioned coaxially around the shaft 152 of the clamp adjuster 148 and positioned between the head 150 of the clamp adjuster 148 and the movable jaw 132. The spring 154 is positioned to apply a constant force between and upon the movable jaw 132 and the clamp adjuster 148 to assist in adjustment (e.g., rotation) of the clamp adjuster 148 and linear movement of the movable jaw 132.

In an example embodiment, the clamp 124 includes a jaw guide 156. The jaw guide 156 defines a jaw channel within which the movable jaw 132 translates, for example, in the direction of directional arrow 326 (FIGS. 2, 3, 5 and 7). The jaw guide 156 prevents rotation of the movable jaw 132 in response to rotation of the clamp adjuster 148 and allows movement of the movable jaw 132 along a linear path.

The bracket assembly 106 includes a bracket connector 158 and a bracket 160. The bracket connector 158 is connected to the bracket carriage 128. The bracket 160 is connected to the power tool 200. As an example, the bracket 160 is fastened to the housing of the power tool 200 by a mechanical (e.g., threaded fastener). The bracket connector 158 retains the bracket 160 such that the surface finishing attachment 204 of the power tool 200 is positioned at a predetermined orientation relative to the flange surface 304, for example, approximately parallel to the flange surface 304.

In an example embodiment, the bracket connector 158 includes a bracket receiver 162. The bracket receiver 162 defines a bracket channel within which the bracket 160 is received. As an example, the bracket receiver 162 may prevent rotation of the bracket 160 and, thus, the power tool 200 in response to contact between the surface finishing attachment 204 and the flange surface 304 during the surface finishing operation. As another example, the bracket receiver 162 may be rotatably connected to the bracket connector 158 such that the angular orientation of the bracket receiver 162 and, thus, the bracket 160 relative to the bracket connector is adjustable and the angular orientation of the power tool 200 relative to the flange surface 304 is adjustable.

The bracket assembly 106 also includes a bracket positioner 164 connected to the bracket connector 158. As an example, the bracket positioner 164 includes a threaded shaft 168 (FIGS. 3 and 7) and a head 166. The shaft 152 of the bracket positioner 164 is threadably coupled to and extends through a threaded hole formed through the bracket connector 158.

The bracket positioner 164 sets the position of the bracket carriage 128 and, thus, the bracket assembly 106 relative to the bracket rail 126. Adjustment (e.g., rotation) of the bracket positioner 164 fixes the linear position of the bracket carriage 128 and, thus, the bracket assembly 106 along the bracket rail 126. As an example, rotation (e.g., tightening) of the bracket positioner 164 moves an end of the shaft 168 of the bracket positioner 164 toward the bracket rail 126 and into frictional contact with a surface of the bracket rail 126 to prevent movement of the bracket carriage 128. As another example, counter-rotation (e.g., loosening) of the bracket positioner 164 moves the end of the shaft 168 of the bracket positioner 164 away from the surface of the bracket rail 126 to allow free linear movement of the bracket carriage 128 along the bracket rail 126.

The bracket assembly 106 also includes a bracket retainer 170 connected to the bracket connector 158. As an example, the bracket retainer 170 includes a threaded shaft (not visible) and a head 172. The shaft of the bracket retainer 170 is threadably coupled to and extends through a threaded hole formed through the bracket connector 158.

The bracket retainer 170 secures the bracket 160 within the bracket receiver 162. As an example, rotation (e.g., tightening) of the bracket retainer 170 moves an end of the shaft of the bracket retainer 170 into the channel defined by the bracket receiver 162 and into frictional contact with a surface of the bracket 160 to prevent linear movement of the bracket 160 within the bracket receiver 162. As another example, counter-rotation (e.g., loosening) of the bracket retainer 170 moves the end of the shaft of the bracket retainer 170 away from the surface of the bracket 160 to allow linear movement of the bracket 160 within the bracket receiver 162, for example, to adjust the position of the bracket 160 and, thus, the power tool 200 or remove the bracket 160 from within the bracket receiver 162.

The head 136 of the drive adjuster 112, the head 150 of the clamp adjuster 148, the head 166 of the bracket positioner 164 and/or the head 172 of the bracket retainer 170 may be tall head with ridged or knurled sides such that it may be tightened and loosened by hand, without the need for a tool.

Figure 10:
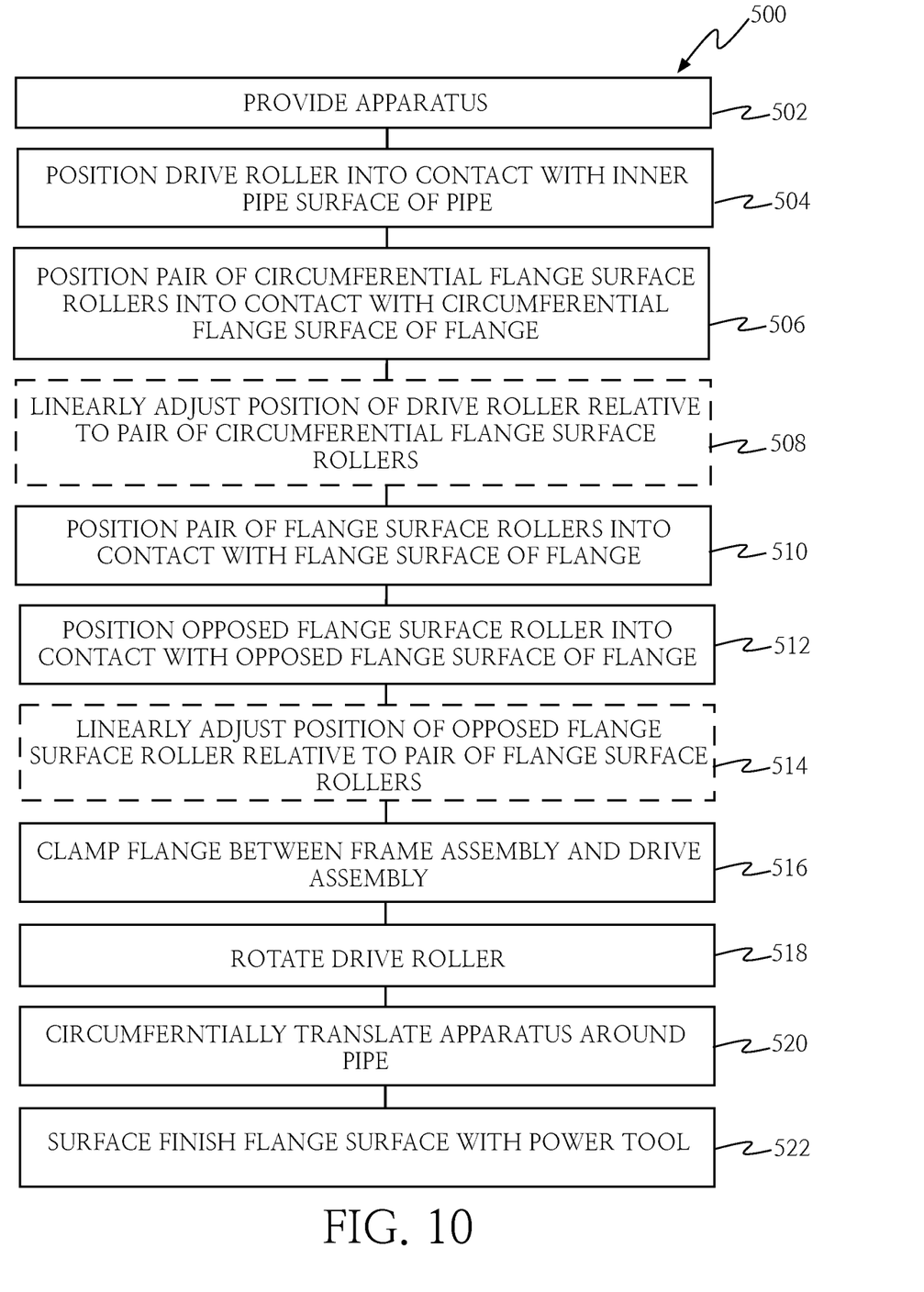
FIG. 10 is a flow diagram of one embodiment of the disclosed method for surface finishing a flange surface of a flange of a pipe.

Referring to FIG. 10, flow diagram 500 depicts an example method for surface finishing the flange surface 304 of the flange 302 of the pipe 300 using the disclosed apparatus 100 shown in FIGS. 1-9. At block 502, the apparatus 100 is provided. The apparatus 100 includes the frame assembly 102, the drive assembly 104 and the bracket assembly 106.

At block 504, the drive roller 120 of the drive assembly 104 is positioned into contact with the inner pipe surface 306 of the pipe 300. At block 506, the pair of circumferential flange surface rollers 142 of the frame assembly 102 is positioned into contact with the circumferential flange surface 314 of the flange 302.

At block 508, optionally, a position of the drive roller 120 relative to the pair of circumferential flange surface rollers 142 is linearly adjusted to accommodate for the width 316 of the flange 302.

At block 510, the pair of flange surface rollers 144 of the frame assembly 102 is placed into contact with the flange surface 304 of the flange 302. At block 512, the opposed flange surface roller 146 of the frame assembly 102 is positioned into contact with the opposed flange surface 312 of the flange 302.

At block 516, optionally, a position of the opposed flange surface roller 146 relative to the pair of flange surface rollers 144 is linearly adjusted to accommodate for the thickness 318 of the flange 302.

At block 516, the flange 302 is clamped between the frame assembly 102 and the drive assembly 104.

At block 518, the drive roller 120, in contact with the inner pipe surface 306 of the pipe 300, is rotated with the drive motor 118 of the drive assembly 104. At block 520, the apparatus 100 is circumferentially translated around the pipe 300.

At block 522, the flange surface 304 of the flange 302 is surface finished with the power tool 200 coupled to the bracket assembly 106.

Although various embodiments of the disclosed system and method have been shown and described, modifications may occur to those skilled in the art upon reading the specification. The present application includes such modifications and is limited only by the scope of the claims.

What is claimed is:

1. An apparatus for surface finishing a flange surface of a flange of a pipe, said apparatus comprising:
   a frame assembly;
   a drive assembly coupled to said frame assembly and movable relative to said frame assembly; and
   a bracket assembly coupled to said frame assembly and movable relative to said frame assembly; and wherein:
   said flange is clamped between said frame assembly and said drive assembly;
   said drive assembly and said bracket assembly are movable independent of and relative to each other;
   said drive assembly circumferentially translates said apparatus around said pipe; and
   a power tool is coupled to said bracket assembly to perform said surface finishing operation on said flange surface of said flange.

2. The apparatus of claim 1 wherein said drive assembly is linearly movable relative to said frame assembly along a linear path.

3. The apparatus of claim 2 wherein said bracket assembly is linearly movable relative to said frame assembly along another linear path that is parallel to said linear path of said drive assembly.

4. The apparatus of claim 1 wherein said frame assembly comprises:
   a linear drive rail; and
   a drive carriage connected to said drive rail, wherein said drive carriage is freely movable along said drive rail, and wherein said drive assembly is coupled to said drive carriage.

5. The apparatus of claim 1 wherein said frame assembly comprises:
   a linear bracket rail; and
   a bracket carriage connected to said bracket rail, wherein said bracket carriage is freely movable along said bracket rail, and wherein said bracket assembly is coupled to said bracket carriage.

6. The apparatus of claim 1 wherein said drive assembly comprises:
   a drive motor coupled to said frame assembly; and
   a drive roller operatively coupled to said drive motor, wherein said drive roller is positioned to engage an inner pipe surface of said pipe; and wherein:
   said flange is clamped between said frame assembly and said drive roller; and
   rotation of said drive roller, in contact with said inner pipe surface of said pipe, circumferentially translates said apparatus around said pipe.

7. The apparatus of claim 1 wherein said frame assembly comprises a clamp, and wherein said flange is positioned within said clamp and is clamped between said clamp and said drive assembly.

8. The apparatus of claim 1 wherein said frame assembly comprises:
   at least one flange surface roller positioned to engage said flange surface of said flange; and
   at least one opposed flange surface roller positioned to engage a second flange surface of said flange that is opposite to the flange surface;
   at least one circumferential flange surface roller positioned to engage a third flange surface of said flange that extends between said flange surface and said second flange surface; and wherein:
   said flange is clamped between said circumferential flange surface roller and said drive assembly; and
   said flange is clamped between said flange surface roller and said opposed flange surface roller.

9. The apparatus of claim 8 wherein said frame assembly comprises:
   a stationary jaw, wherein said circumferential flange surface roller and said flange surface roller are freely rotatably connected to said stationary jaw;
   a jaw guide connected to said stationary jaw;
   a movable jaw connected to said jaw guide, wherein said opposed flange surface roller is freely rotatably connected to said movably jaw; and
   a clamp adjuster interconnecting said stationary jaw and said movable jaw, wherein adjustment of said clamp adjuster linearly moves said movable jaw within said jaw guide relative to said stationary jaw.

10. The apparatus of claim 1 wherein said bracket assembly comprises:
    a bracket connector coupled to said frame assembly;
    a bracket receiver connected to said bracket connector; and
    a bracket received by said bracket receiver, wherein said power tool is connected to said bracket.

11. A method for surface finishing a flange surface of a flange of a pipe using a surface finishing apparatus, comprising a frame assembly, a drive assembly coupled to said frame assembly, and a bracket assembly coupled to said frame assembly, said method comprising:
    coupling a power tool to said bracket assembly;
    positioning said flange between said frame assembly and said drive assembly;
    clamping said flange between said frame assembly and said drive assembly by moving said drive assembly relative to said frame assembly;
    positioning said power tool relative to said flange surface by moving said bracket assembly relative to said frame assembly, wherein said drive assembly and said bracket assembly are movable independent of and relative to each other;

circumferentially translating said apparatus around said pipe; and surface finishing said flange surface of said flange with said power tool.

12. The method of claim 11 further comprising:

positioning a drive roller of said drive assembly into contact with an inner pipe surface of said pipe;

positioning a pair of flange surface rollers of said frame assembly into contact with said flange surface of said flange;

positioning an opposed flange surface roller of said frame assembly into contact with a second flange surface of said flange that is opposite to the flange surface;

positioning a pair of circumferential flange surface rollers of said frame assembly into contact with a third flange surface of said flange that extends between said flange surface and said second flange surface; and rotating said drive roller, in contact with said inner pipe surface of said pipe, with a drive motor of said drive assembly.

13. The method of claim 12 further comprising:

linearly adjusting a position of said drive roller relative to said pair of circumferential flange surface rollers by linearly moving said drive assembly relative to said frame assembly to accommodate for a width of said flange.

14. The method of claim 12 further comprising:

linearly adjusting a position of said opposed flange surface roller relative to said pair of flange surface rollers to accommodate for a thickness of said flange.

15. The method of claim 12 further comprising:

clamping said flange between said drive roller and said pair of circumferential rollers.

16. The method of claim 12 further comprising:

clamping said flange between said pair of flange surface rollers and said opposed flange surface roller.

17. An apparatus for surface finishing a flange surface of a flange of a pipe, said apparatus comprising:

a frame assembly;

a drive motor coupled to said frame assembly and movable relative to said frame assembly;

a drive roller operatively coupled to said drive motor and positioned to engage an inner pipe surface of said pipe; and a bracket assembly coupled to said frame assembly and movable relative to said frame assembly; and wherein:

said flange is clamped between said frame assembly and said drive roller;

said drive motor and said bracket assembly are movable independent of and relative to each other;

rotation of said drive roller, in contact with said inner pipe surface of said pipe, circumferentially translates said apparatus around said pipe; and a power tool is couplable to said bracket assembly to perform said surface finishing operation on said flange surface of said flange.

18. The apparatus of claim 17 wherein:

said drive motor is linearly movable relative to said frame assembly; and said bracket assembly is linearly movable relative to said frame assembly.

19. The apparatus of claim 17 wherein said drive motor and said bracket assembly are linearly movable relative to each other.

20. The apparatus of claim 17 wherein said frame assembly comprises:

at least one flange surface roller positioned to engage said flange surface of said flange; and at least one opposed flange surface roller positioned to engage a second flange surface of said flange that is opposite to the flange surface;

at least one circumferential flange surface roller positioned to engage a third flange surface of said flange that extends between said flange surface and said second flange surface; and wherein:

said flange is clamped between said circumferential flange surface roller and said drive assembly; and said flange is clamped between said flange surface roller and said opposed flange surface roller.

* * * * *